(12) United States Patent
Kanamoto (10) Patent No.: US 6,968,397 B1
(45) Date of Patent: Nov. 22, 2005

(54) INFORMATION PROCESSING METHOD AND APPARATUS

(75) Inventor: Yoshiji Kanamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 09/672,770

(22) Filed: Sep. 29, 2000

(30) Foreign Application Priority Data

Sep. 30, 1999 (JP) .................................. 11-279374

(51) Int. Cl.[7] .......................................... G06F 13/00
(52) U.S. Cl. ...................... 709/250; 710/65; 711/202
(58) Field of Search ..................... 709/250; 711/202; 710/65

(56) References Cited

U.S. PATENT DOCUMENTS

| | | | | |
|---|---|---|---|---|
| 5,964,865 A | * | 10/1999 | McCulloch et al. | 712/35 |
| 5,973,675 A | * | 10/1999 | Joto et al. | 345/168 |
| 6,049,854 A | * | 4/2000 | Bedarida | 711/153 |
| 6,088,454 A | * | 7/2000 | Nagashima et al. | 380/286 |
| 6,282,624 B1 | * | 8/2001 | Kimura et al. | 711/202 |
| 6,470,380 B1 | * | 10/2002 | Yoshizawa et al. | 709/213 |

* cited by examiner

Primary Examiner—Viet D. Vu
(74) Attorney, Agent, or Firm—Fitzpatrick, Cella, Harper & Scinto (57) ABSTRACT

Information processing method and apparatus for original image protection in a simple manner at a low cost. When data is stored, a desired key code is inputted from an operation unit. An address conversion unit converts an address from an address output unit designating a storage position of a frame memory into a physical address of the frame memory based on the input desired key code, and the data is stored into a storage area of the frame memory designated by the converted physical address. As the data stored in the frame memory is held in this manner, even if the data is read out, an original cannot be reproduced as long as address conversion algorithm is unknown. Further, before the key code inputted from the operation unit is sent to the address conversion unit, it is shuffled in a key register. Thus key code security is improved.

32 Claims, 7 Drawing Sheets

INFORMATION PROCESSING METHOD AND APPARATUS

FIELD OF THE INVENTION

The present invention relates to information processing method and apparatus, and more particularly, to information processing method and apparatus for prevention against original image reproduction from image data.

BACKGROUND OF THE INVENTION

Generally, when image information is stored into a memory, gray scale levels of respective pixels are obtained as numerical values and the data is stored in a predetermined order in continuous memory areas.

Further, the data string format upon storage of pixel information into memory differs in accordance with format or implementation of data processing algorithm of device to input images to a frame memory or device to output images from the memory, however, memory access is always made in accordance with the same procedure inside the device.

That is, when pixel information stored in a particular address is accessed, the same address value is always used.

Accordingly, in an image processing apparatus having a conventional storage device, there is a strong linkage between the content of the frame memory and an original image. In this case, if the content of the frame memory can be obtained or referred to by any means, the original image can be comparatively easily reproduced even though the procedure upon image data generation is not known.

However, this fact is very inconvenient in consideration of image information security.

For example, when the content of frame memory is stored in a file in another place or transferred to another place via a network, a third person may have an opportunity to access the image data during such data transfer which is often performed as daily work. As a result, there is a high probability that the image data is reproduced and the content of the original image is known.

Generally, confidential documents and the like are encrypted for protection of the contents. However, encryption is generally complicated and time-consuming processing, and further, installation of the encryption processing program is often difficult.

SUMMARY OF THE INVENTION

The present invention has been made in consideration of the above situation, and has its object to provide information processing method and apparatus to realize a function to cause difficulty in analysis of data, even if the data is read by a third person, by a particular memory addressing method.

Another object of the present invention is to provide information processing method and apparatus which realize a function to, especially upon image data storage, weaken the linkage between a frame memory and an original image by the particular memory addressing method, so as to cause difficulty in reproduction of the original image.

According to the present invention, to solve the above objects, provided is an information processing apparatus for storing data into storage means, comprising: key input means for inputting a desired key code; address conversion means for converting a first address designating a storage position of the storage means for holding the data to a second address based on the desired key code inputted by the input means; and storage control means for storing the data in a storage area of the storage means designated by the second address obtained by the address conversion means.

In the information processing, the address conversion means performs mutually reversible conversion between the first address and the second address by the same key code. Further, the address conversion means interchanges several address lines of the first address based on the desired key code inputted by the key input means to generate the second address. Further, if the data is image data, the address conversion means performs address conversion so as to interchange positions of a predetermined areas divided from the image.

Further, the information processing apparatus further comprises key code conversion means for generating a second key code from the input desired key code, and the address conversion means converts the first address to the second address based on the second key code.

Further, The information processing apparatus further comprises input selection means for selecting one input destination from plural data input destinations, and data from the input destination selected by the input selection means is stored into the storage means.

Further, in the information processing apparatus, the plural data input destinations include a scanner, a large-capacity storage device and a communication device.

Further, the information processing apparatus further comprises output selection means for selecting one output destination from plural data output destinations, and data read from the storage means is outputted to the output destination selected by the output selection means.

Further, in the information processing apparatus, the plural data output destinations include a printer, a large-capacity storage device, a display and a communication device. Further, the data is image data.

Further, the information processing apparatus further comprises a scanner for inputting data to be stored in the storage means and a printer for outputting data stored in the storage means, and the information processing apparatus operates as a copying machine. Further, in the information processing apparatus a scanner or communication device can be selected as an input source for inputting data to be stored in the storage means, and the communication device and a printer can be selected as an output destination for outputting data from the storage means, further, the information processing apparatus operates as a facsimile machine.

Further, the information processing apparatus further comprises address conversion designation means for designating execution or non-execution of address conversion by the address conversion means.

Further, provided is a data security method for the information processing apparatus, comprising the steps of: for encryption, storing input data into the storage means while converting an address by the address conversion means based on the desired key code inputted from the key input means, and outputting the data as encrypted data to the outside and holding the data; and for decryption, storing the held data as input data into the storage means while converting the address by the address conversion means based on the same key code as the desired key code inputted from the key input means, and outputting the data as decrypted data to the outside.

Further, provided is a data security method for the information processing apparatus, comprising the steps of: for encryption, storing the key code and input data into the storage means while converting an address by the address conversion means based on the desired key code inputted from the key input means, and outputting them as encrypted data to the outside and holding the data; and for decryption, storing the held data as input data into the storage means while converting the address by the address conversion means based on the same key code as the desired key code reproduced from the held data, and outputting the data as decrypted data to the outside.

Further, provided is an information processing for storing data into storage means, comprising: a key input step of inputting a desired key code; an address conversion step of converting a first address designating a storage position of the storage means for holding the data to a second address based on the desired key code inputted at the input step; and a storage control step of storing the data in a storage area of the storage means designated by the second address obtained at the address conversion step.

In the information processing method, at the address conversion step, mutually reversible conversion is performed between the first address and the second address by the same key code. Further, at the address conversion step, several bits of the first address are interchanged based on the desired key code inputted at the key input step, to generate the second address. Further, at the address conversion step, if the data is image data, address conversion is performed so as to interchange positions of a predetermined areas divided from the image.

Further, the information processing method further comprises a key code conversion step of generating a second key code from the input desired key code, and at the address conversion step, the first address is converted to the second address based on the second key code. Further, the data is image data.

Further, provided is a security method in use of the information processing method in a printer, comprising the steps of: encrypting received image data by the information processing method and print-outputting the data; and reading the print-outputted encrypted data by a scanner or copying machine capable of decryption in accordance with the same key as that used in encryption by the information processing method.

Further, provided is a security method in use of the information processing method in a scanner, comprising the steps of: encrypting read image data by the information processing method; and print-outputting or decoding the encrypted data by a printer or computer capable of decryption in accordance with the same key as that used in encryption by the information processing method.

Further, provided is a security method in use of the information processing method in a copying machine, comprising the steps of: encrypting read image data by the information processing method and print-outputting the data; and reading the print-outputted encrypted data in accordance with the same key as that used in encryption by the information processing method.

Further, provided is a security method in use of the information processing method in a facsimile machine, comprising the steps of: encrypting read image data by the information processing method and transmitting the data; and decrypting the received encrypted data in accordance with the same key as that used in encryption by the information processing method and print-outputting the data.

Further, the security method further comprises the steps of: print-outputting the received encrypted data; and reading the print-outputted encrypted data, decrypting the data in accordance with the same key as that used in encryption by the information processing method and print-outputting the data.

Further, provided is a security method in use of the information processing method in a communication device, comprising the steps of: encrypting data by the information processing method and transmitting the data; and decrypting the received encrypted data in accordance with the same key as that used in encryption by the information processing method and print-outputting the data. Further, the key is embedded in an encryption key to be transmitted.

Further, provided is a security method in use of the information processing method in a computer, comprising the steps of: encrypting data by the information processing method and storing the data; and decrypting the stored encrypted data in accordance with the same key as that used in encryption by the information processing.

Further, provided is a storage medium for storing an information processing program in case of storing data into storage means in a computer-readable format, wherein the information processing program includes at least an address conversion step of converting a first address designating a storage position of the storage means for storing the data into a second address based on an input desired key code.

Further, in the storage medium, the information processing program further includes: a key input step of inputting a desired key code; and a storage control step of storing the data into a storage area of the storage means designated by the second address obtained at the address conversion step. Further, at the address conversion step, mutually reversible conversion is performed between the first address and the second address by the same key code. Further, at the address conversion step, wherein at the address conversion step, several bits of the first address are interchanged based on the desired key code inputted at the key input step, to generate the second address.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
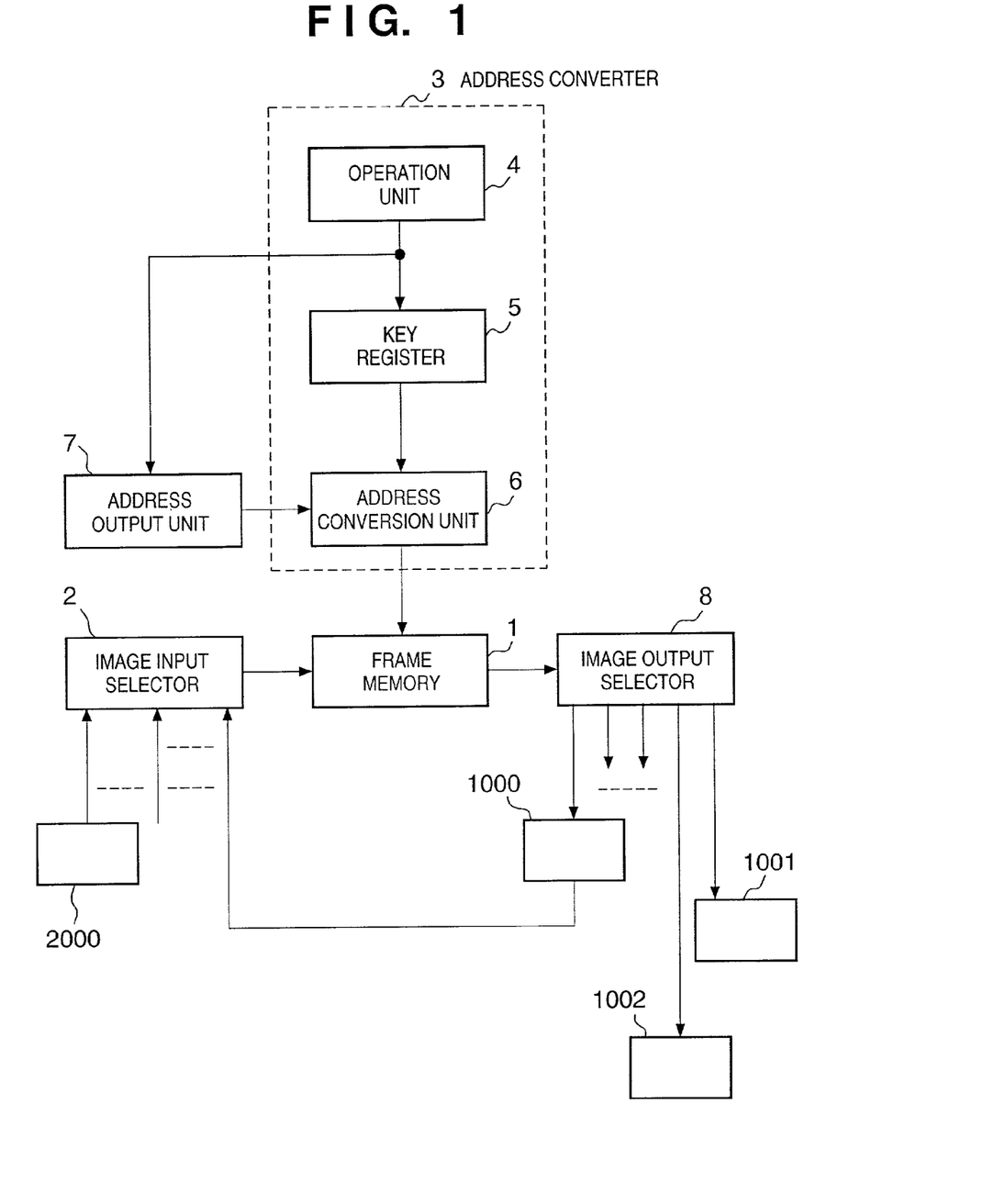
FIG. 1 is a block diagram showing the basic construction of an information processing apparatus according to a first embodiment of the present invention.

FIG. 1 is a block diagram showing the construction of an information processing apparatus to which a first embodiment of the present invention is applied.

The information processing apparatus of the embodiment has a function to scan an original document and store image data into a large-capacity storage device, and a function to search the large-capacity storage device for a target document and print-output the document from an output device such as a printer, in accordance with necessity.

In FIG. 1, a frame memory 1 stores image data which is an object of processing.

An image input selector 2 designates a device as an input source of image data to be inputted into the frame memory 1 such as an image scanner 2000 or a large-capacity storage device 1000. A communication device may be included in the input sources.

Further, an image output selector 8 designates an output destination for image data read out of the frame memory 1, such as a printer 1001, the large-capacity storage device 1000 or a display monitor 1002. The communication device may be included in the output destination devices.

An address converter 3, as an element characteristic of the present embodiment, converts a physical address to designate a data storage position on the frame memory 1. The address converter 3 has an operation unit 4, a key register 5 and an address conversion unit 6.

The operation unit 4 is a data input device having a keyboard, a pointing device and the like.

The operation unit 4 accepts input of numeral as a conversion key referred to by the address conversion unit 6, from an operator. The input numeral, which is information as a key to generate address conversion pattern to be described later, plays a role of encryption key according to the present embodiment. Further, mode designation data designating a normal mode to access the frame memory 1 without address conversion or an encryption mode to access the frame memory 1 with address conversion is inputted. The input numeral (encryption key) and the mode designation data are stored into the key register 5. Further, an address to access the frame memory 1 or a designation address designating an address range may be inputted.

Note that when the entire address range of the frame memory 1 is to be converted, the designation address is not necessary. The mode designation data and the numeral (encryption key) are transferred to the address conversion unit 6. The address conversion unit 6 performs processing in accordance with these data. Further, when the designation address is inputted, it is sent to an address output unit 7. The address output unit 7 outputs an address to the address conversion unit 6 based on the designation address to designate the address or address range. The address to access the frame memory or designation address designating address range may be inputted into the address output unit 7 from an image input unit or other external memory controller than the operation unit 4.

When image data inputted via the image input selector 2 is stored into the frame memory 1, if the mode designation data designating the normal mode is inputted from the key register 5, the address conversion unit 6 outputs an address to the frame memory 1 based on the physical address generated by the address output unit 7. In synchronization with the address output, the predetermined image data is provided to the frame memory 1 via the image input selector 2, and the image data is stored.

On the other hand, if the encryption mode is designated, the address conversion unit 6 performs conversion on the physical address provided from the address output unit 7 by using the numeral stored in the key register 5. Then, the address conversion unit 6 outputs the converted address to the frame memory 1. In synchronization with the address output, the predetermined image data is provided to the frame memory 1 via the image input selector 2, and the image data is stored.

Accordingly, from hardware of an external device which accesses the frame memory 1, it appears that the data is written into the frame memory 1 in a position corresponding to the physical address generated by the address output unit 7. However, the position in which the data is actually written differs in accordance with key.

The address conversion mentioned above can be carried out by using a conversion table which can converts each address of the frame memory 1 into another one, randomly and biunivoquely. The conversion process is performed as follows, when the address and the key are provided, the address conversion unit 6 adds the address and the key, and inputs the result of addition into the conversion table, then a converted address is obtained as an output from the conversion table, wherein if the sum of the address and the key is greater than the maximum value of addresses of the frame memory 1, a value generated by subtracting the maximum value from the sum is provided to the conversion table.

By the above processing, the image data can be stored into the frame memory 1 in a manner such that even if the image data in the frame memory 1 is read from the outside, original image reproduction cannot be made from the stored image data.

Next, when image data stored in the frame memory 1 is to be read, the address output unit 7 generates a read address and outputs it to the address conversion unit 6. If the normal mode is designated, the address conversion unit 6 supplies the same address as that inputted from the address output unit 7 to the frame memory 1, and data in a position corresponding to the address is outputted from the frame memory 1 to the image output selector 8.

As described above, if the encryption mode is designated, the address conversion unit 6 converts the physical address provided from the address output unit 7 by using the numeral stored in the key register 5. Then the address conversion unit 6 outputs the converted address to the frame memory 1. In synchronization with the address output, the image data stored in the input address is read out and outputted to the image output selector 8. The address conversion for image reading can be carried out by an invert conversion of the conversion for image storing. That is the provided address is converted to an address by referring the conversion table in a reverse way, the address for reading is obtained by subtracting the key from the output of the conversion table, wherein if the output is smaller than key, a value generated by adding the maximum value of addresses of the frame memory 1 to the subtraction is provided as the address for reading to the frame memory 1.

The image output selector 8 outputs the input image data to, e.g., the large-capacity storage device 1000. The large-capacity storage device 1000 holds the data.

If the image data stored in the large-capacity storage device 1000 is printed out from the printer 1000, for example, the image input selector 2 selects the large-capacity storage device 1000 as an image data input destination, and the image output selector 8 selects the printer 1001 as an output destination.

To normally read image data from the frame memory 1, the above-described key inputted from the operation unit 4 or external device is necessary.

That is, when the image data is read from the frame memory 1, if a wrong key is inputted, image data for normal reproduction of original image cannot be outputted from the frame memory 1. Thus, the original image reproduction from image data stored in the frame memory 1 can be protected.

Figure 2:
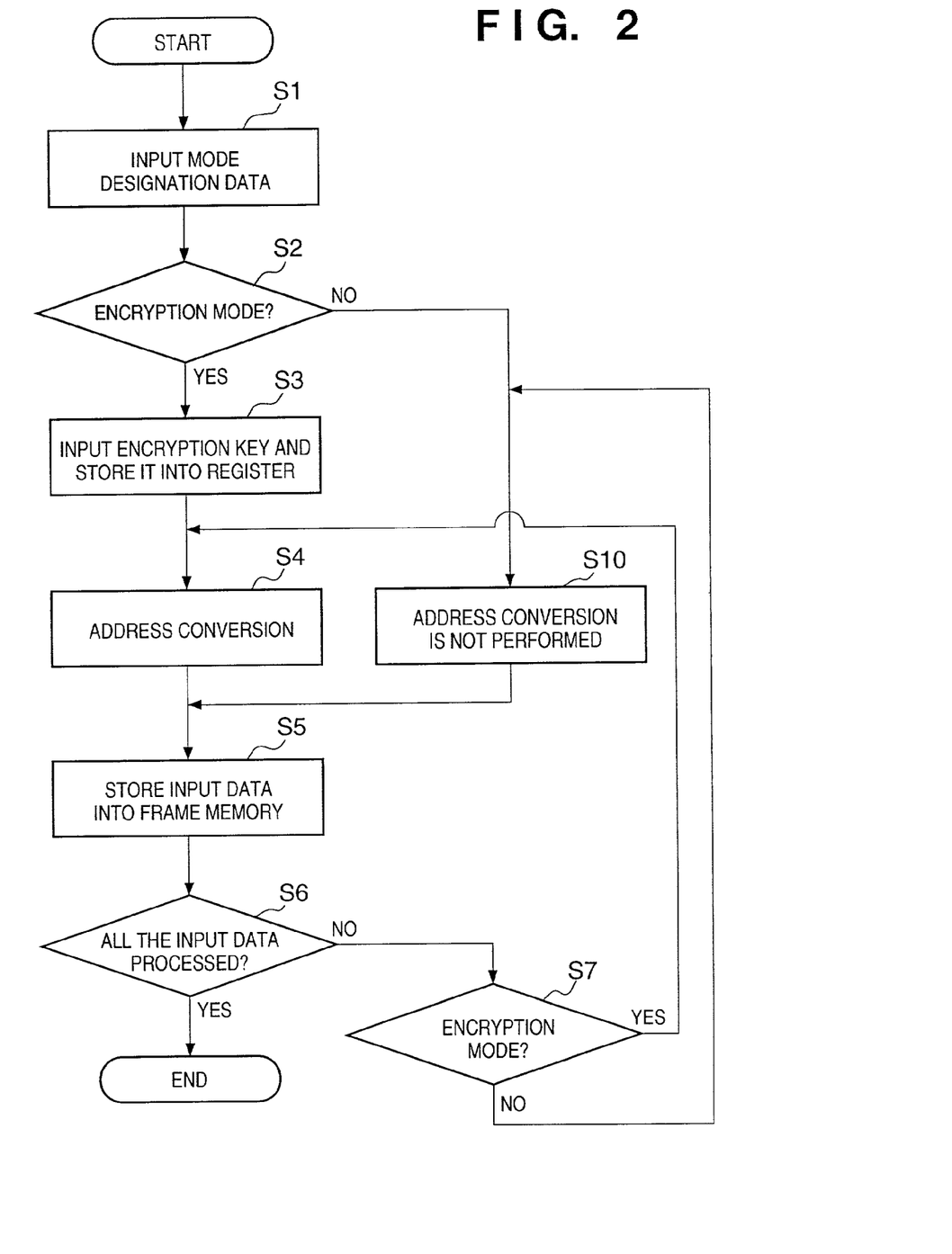
FIG. 2 is a flowchart showing processing for storing image data into a frame memory of the information processing apparatus according to the first embodiment.

Next, the flowchart of FIG. 2 shows a processing operation for storing image data into the frame memory 1 according to the present embodiment.

In FIG. 2, at step S1, the operation unit 4 inputs mode designation data designating the normal mode or the encryption mode.

At step S2, the operation unit 4 checks the input mode. If the input mode is the normal mode, as it is not necessary to perform address conversion, the process proceeds to step S10, while if the input mode is the encryption mode, proceeds to step S3.

At step S3, the operation unit 4 inputs an encryption key as a cipher, and stores it into the key register 5. The encryption key is not necessarily a numeral but may be an arbitrary alphabet string or the like. However, in consideration of normal stand-alone business machines, as it is convenient to limit ten-keys as means for inputting the key, only numerals are inputted in this embodiment. Next, if necessary, the operation unit 4 inputs a write designation address or address designating a write section with respect to the frame memory 1, and transmits the address to the address output unit 7. Note that if the entire area of the frame memory is to be subjected to writing processing, the input of designation address or writing section is not necessary.

At step S4, the address conversion unit 6 inputs the encryption key from the key register 5, then converts an address outputted from the address output unit 7 based on the encryption key, and supplies the converted address to the frame memory 1.

In the encryption-key based address conversion, the address space before the conversion and that after the conversion must be in one-to-one correspondence. If only this condition is satisfied, any method of encryption-key based address conversion is used. More specifically, the address conversion may be performed by using a function performing one-to-one mapping with regard to each element of the address space of the frame memory, or by address bit exchange by referring to a conversion table holding address bit exchange rules based on encryption key.

On the other hand, at step S10, as the normal mode is designated, the address conversion unit 6 outputs the address inputted from the address output unit 7 to the frame memory 1 without any conversion. Note that if the address output unit 7 is included in an external device, step S10 may be omitted.

At step S5, in the frame memory 1, in synchronization with the address input from the address conversion unit 6, image data sent from the image input selector 2 is stored into an internal cell of the address.

At step S6, if there is next address input from the address output unit 7, the process proceeds to step S7, while if there is no address input, the process ends.

At step S7, if the current mode is the encryption mode, the process returns to step S4 to repeat the processing by the address conversion unit 6. If the current mode is the normal mode, the process returns to step S10 to repeat the processing by the address conversion unit 6.

Note that when image data in the encryption mode is written into the frame memory, a predetermined tag code indicating that the writing has been made in the encryption mode may be written, with linkage to a pair of head address and end address before conversion, into a predetermined field of the frame memory. By using the tag code, it can be determined later whether corresponding image data has been stored in the encryption mode or not by designating the head address before conversion and referring to the field.

Further, in the above example, the step of address conversion (S4) and the step of not performing address conversion (S10) are provided. However, it may be arranged such that in case of the encryption mode, an address conversion table is generated based on an encryption key, while in case of the normal mode, address conversion is not performed. In this arrangement, the processing in FIG. 2 can be more simplified.

Next, a processing procedure for reading image data from the frame memory 1 will be described with reference to the flowchart of FIG. 3.

Figure 3:
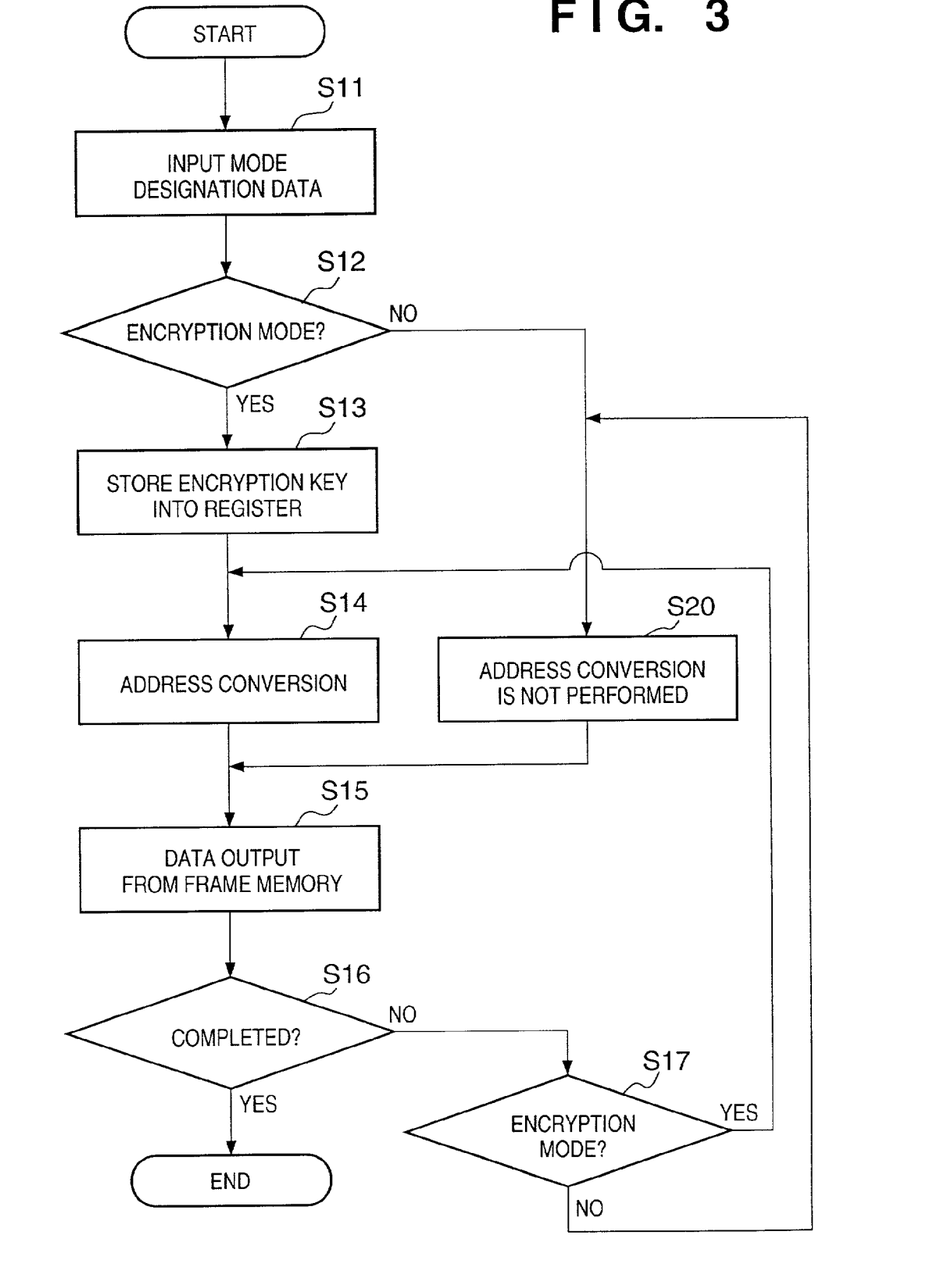
FIG. 3 is a flowchart showing processing for reading image data from the frame memory of the information processing apparatus according to the first embodiment.

In FIG. 3, at step S1, mode designation data designating the normal mode or the encryption mode is inputted from the operation unit 4.

At step S12, the operation unit 4 checks the input mode. If the mode is the normal mode, as address conversion is not necessary, the process proceeds to step S20, while if the mode is the encryption mode, the process proceeds to step S13. Note that if the entire address range of the frame memory area is to be converted, the input of designation address or section is not necessary.

At step S13, an encryption key is inputted from the operation unit 4, and the encryption key is stored into the key register 5. Further, a read out designation address or an address designating a read out section with respect to the frame memory 1 is inputted from the operation unit 4, and is transmitted to the address output unit 7.

At step S14, the encryption key is inputted from the key register 5 into the address conversion unit 6. Then an address outputted from the address output unit 7 is converted based on the encryption key, and is supplied to the frame memory 1.

On the other hand, at step S20, as the normal mode is designated, the address conversion unit 6 outputs the address inputted from the address output unit 7 to the frame memory 1 without any conversion.

At step S15, in the frame memory 1, in synchronization with the address input from the address conversion unit 6, image data is read out from an internal cell of the address and sent to the image output selector 8.

At step S16, if there is next input from the address output unit 7 into the address conversion unit 6, the process proceeds to step S17, while if there is no input, the process ends.

At step S17, if the mode is the encryption mode, the process returns to step S14 to repeat the processing by the address conversion unit 6. If the mode is the normal mode, the process returns to step S20 to repeat the processing by the address conversion unit 6.

Note that in the reading processing in FIG. 3, the address designation may be performed from other external devices than the operation unit 4. In such case, step S10 may be omitted. Further, it may be arranged such that in case of the encryption mode, an address conversion table is generated based on an encryption key, while in case of the normal mode, address conversion is not performed. In this arrangement, the processing in FIG. 3 can be more simplified.

Next, the construction of the address conversion unit 6 will be described with reference to FIG. 4. Note that FIG. 4 also shows related processing units.

Figure 4:
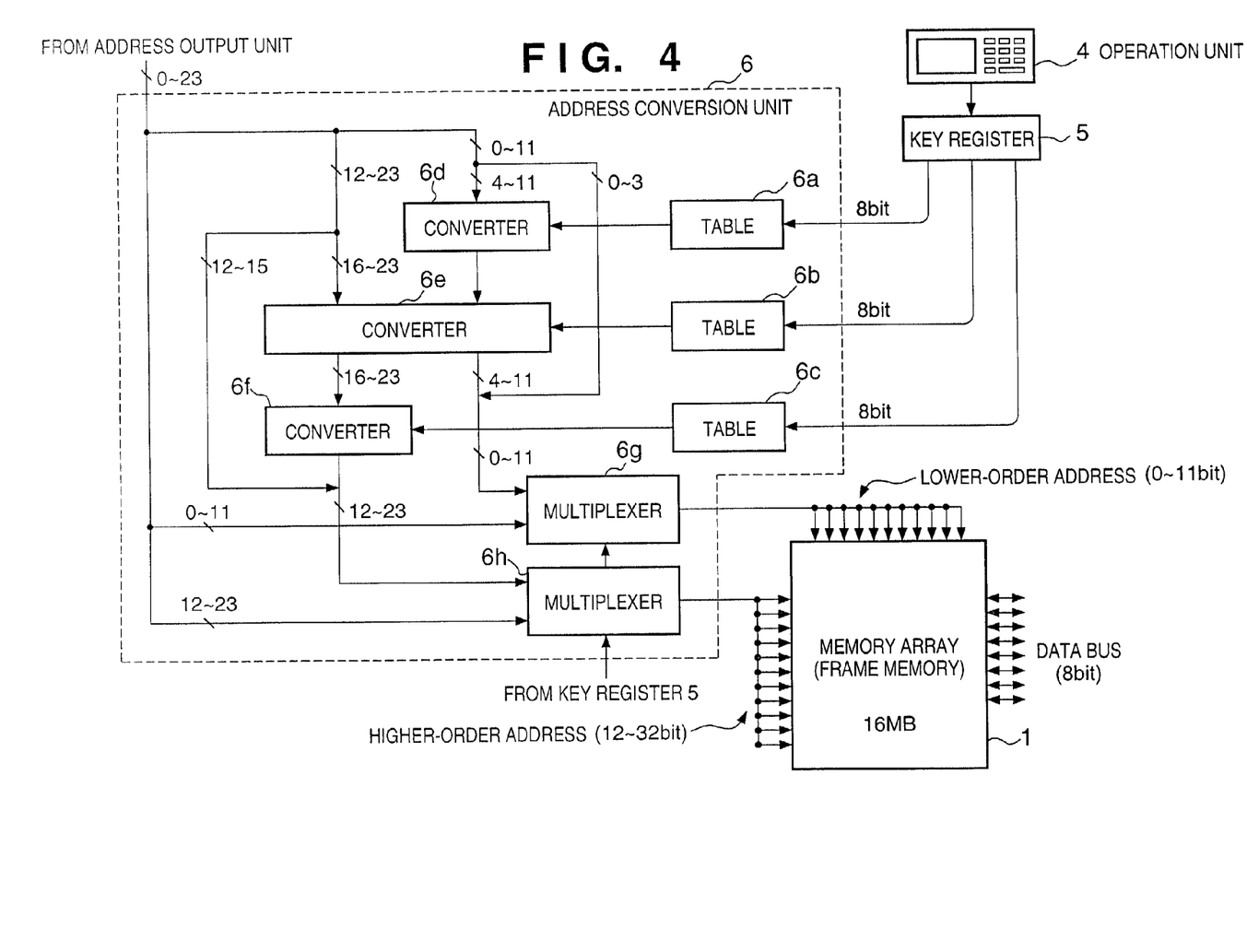
FIG. 4 is a block diagram showing in detail an address conversion unit of the first embodiment.

Referring to FIG. 4, the frame memory 1 has a 16 Mbyte capacity, where 1 byte is used for storing 256 level single-color data. For example, the frame memory 1 can hold raster-scanned 4096×4096 pixel image information.

Further, a 24-bit (8 bits×3) code corresponding to an encryption key inputted from the operation unit 4 is inputted from the key register 5.

Further, a 24-bit frame address is inputted from the address output unit 7.

Note that the present invention is not limited to these numbers of bits.

A several digit decimal integer numerical value is inputted by a user from the operation unit 4, then the numerical value is converted into a hexadecimal number, and stored into the key register 5. From a bit string constructing the register, arbitrary 8 bits are extracted, and three patterns are generated. The generated respective 8-bit data are inputted and stored into respective tables 6a to 6c.

The data stored in the respective tables 6a to 6c are used as keys designating conversion patterns to the converters 6d to 6f.

The address conversion unit 6 performs address conversion in three steps.

The converter 6d performs conversion for 12 bits corresponding to the lower order address. At this time, the conversion processing may be performed in 1-pixel units, however, in actual image information, if address conversion is performed by greater block (n×n), reproduction of original image information is sufficiently difficult from the converted image information.

Accordingly, in this example, to simplify circuits around the converter, 16-pixel address conversion is performed by address-converting only higher order 8 bits without conversion of lower order 4 bits.

The address conversion by the converter 6d corresponds to interchanging 256 horizontal stripe areas (horizontally-continuous 16 pixel areas) in the horizontal direction, in the 4096×4096 pixel image information on the frame memory, in accordance with the content indicated by the table 6a.

On the other hand, the address conversion by the converter 6f corresponds to interchanging 256 vertical stripe areas (vertically-continuous 16 pixel areas) in the vertical direction in accordance with the table 6c.

The address conversion by the converter 6e corresponds to separating the image into 256×256 areas (vertically- and horizontally-continuous 16 pixel areas) and interchanging them in accordance with the table 6b.

As a result, these three address conversion make reproduction of original image information sufficiently difficult if image information stored in the frame memory 1 is read out by an address from the address output unit 7.

In FIG. 4, the tables and the converters are separately provided, however, as long as address conversion is made in accordance with key data, the present invention is not limited to this arrangement. For example, to simplify the circuit construction, it is preferable to construct a look-up table by using a programmable logic array, to obtain a conversion address from the table, with 8-bit information from the key register 5 and address from the address output unit 7 as input. Further, to improve security, it is preferable to sequentially change the conversion method in the address conversion unit 6. Further, in such case it is preferable to realize the address conversion with software.

If address conversion is not performed, the input address from the address output unit 7 is selected by multiplexers 6h and 6g, and the higher order and lower order addresses in the frame memory 1a are respectively designated.

Thereafter, data is sequentially read out from the frame memory 1 from the head address, and stored in the large-capacity storage device 1000 or the like via the image output selector 8.

The encryption processing upon storage of image data into the large-capacity storage device 1000 or the like is as described above. Upon image reproduction, image information is temporarily stored into the frame memory 1 from the head address, then the data is read from the frame memory 1 by using an address converted by the address conversion unit 6 as in the case of storage, outputted from the address output unit 7, and the image is reproduced based on the data.

In this case, the management of encryption key is important. If the algorithm for generating output bits from the address conversion unit 6 or key register 5 is unknown, the key may be included in encrypted image data. Preferably, the encryption key in this case is time-varying data such as processing time. However, there is a possibility that the above algorithm is analyzed. To prevent the analysis of the algorithm, it is necessary to frequently change the algorithm.

Second Embodiment

The second embodiment shows a processing procedure for writing image data into the frame memory 1 in a case where the above-described tag code indicating type of the mode is written in a predetermined field of the frame memory 1 with linkage to a pair of head address and end address before conversion.

Figure 5:
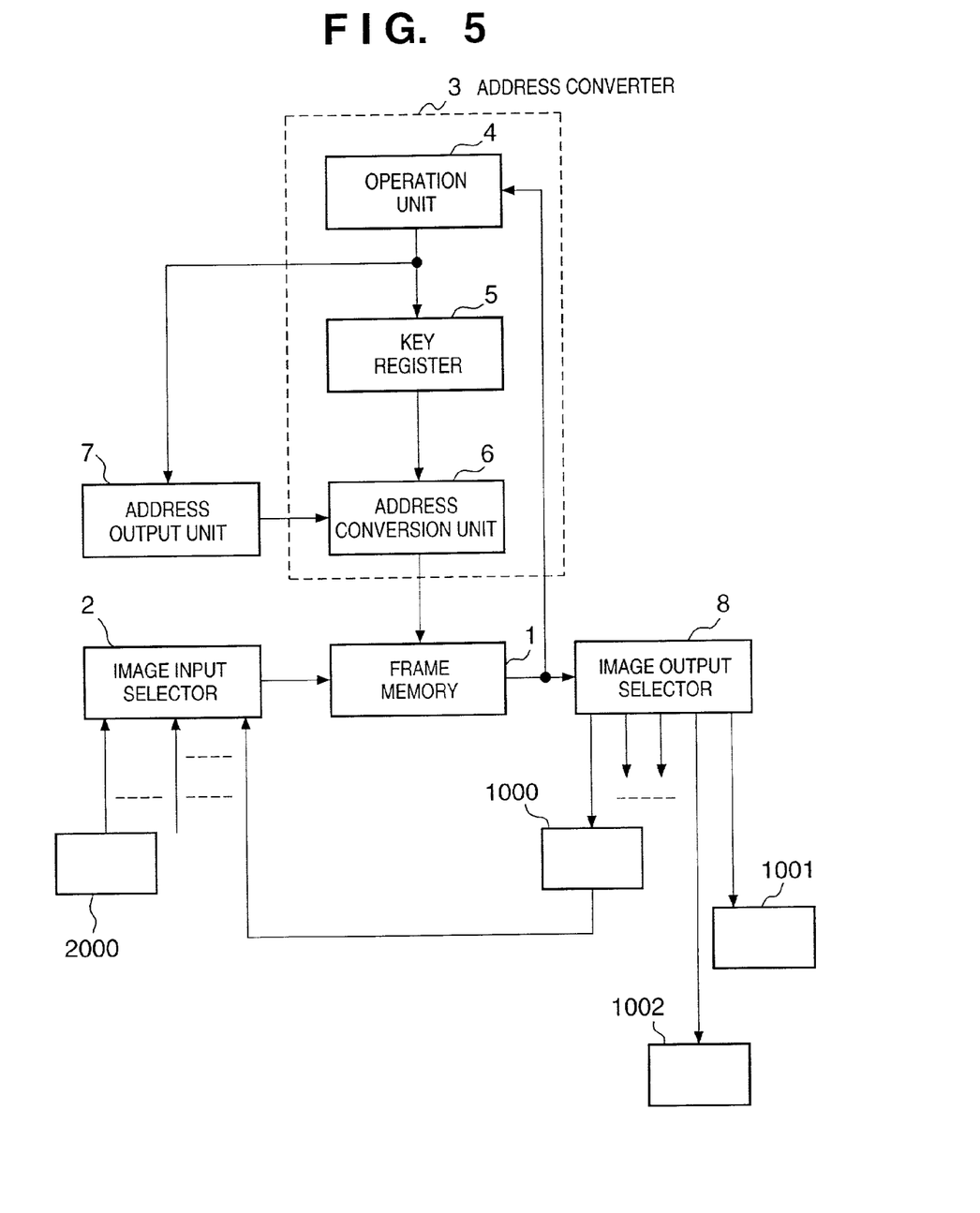
FIG. 5 is a block diagram showing the basic construction of the information processing apparatus according to a second embodiment of the present invention.

FIG. 5 shows the construction of the information processing apparatus according to the second embodiment. FIG. 5 differs from FIG. 1 in that a path to output data read from the frame memory 1 to the operation unit 4 is added, but the other elements are identical to those in FIG. 1. Accordingly, the corresponding processing units have the same reference numerals.

Next, a processing procedure for normally reading predetermined image from the frame memory according to the present embodiment will be described with reference to FIG. 6.

Figure 6:
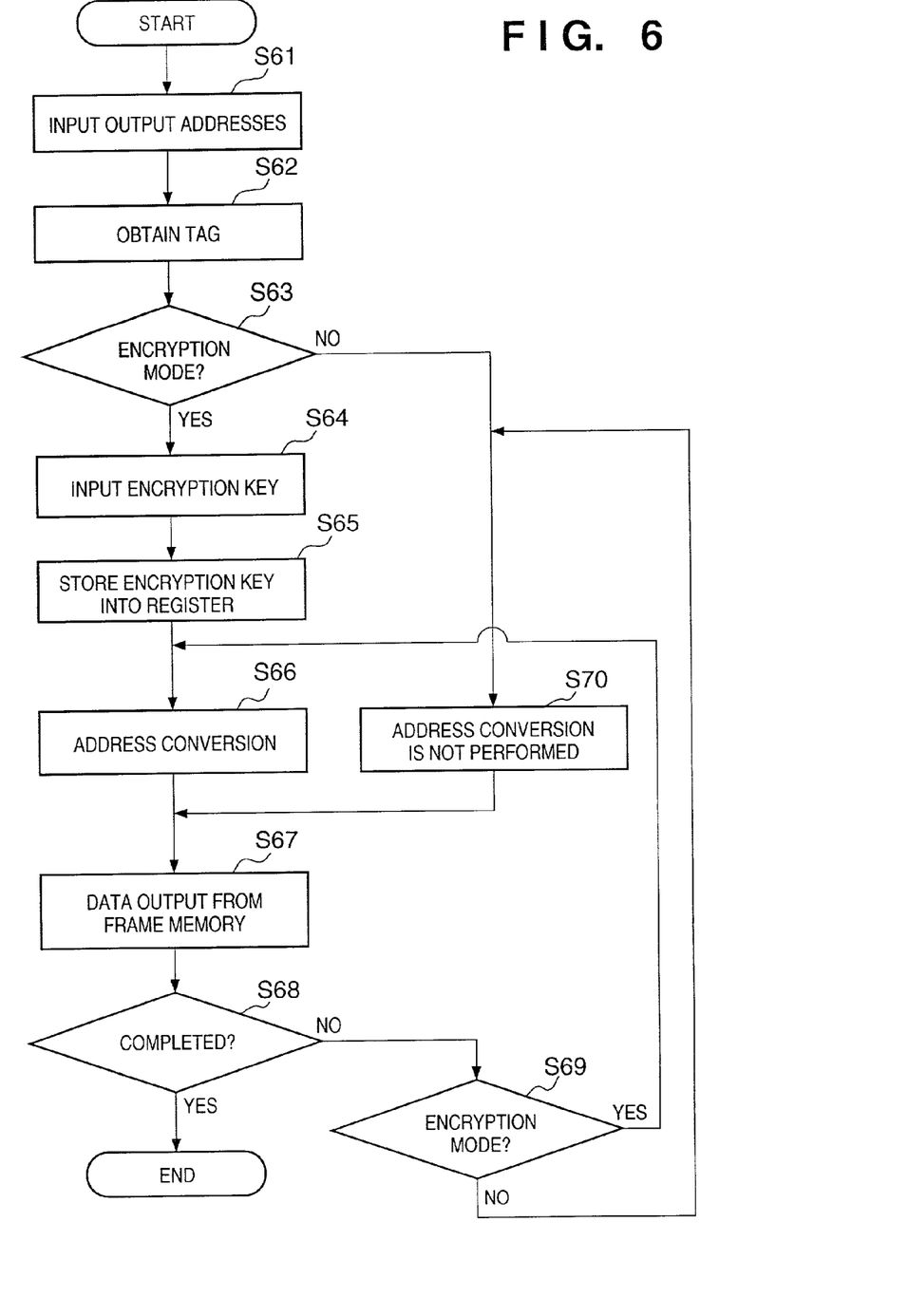
FIG. 6 is a flowchart showing processing for reading image data from the frame memory of the information processing apparatus according to the second embodiment.

In FIG. 6, at step S61, the operation unit 4 inputs output head address and end address from the frame memory 1 and writes them into the key register 5.

At step S62, the operation unit 4 outputs an address of predetermined area holding tag information to the address output unit 7. Further, the mode designation data designating the normal mode is stored in the key register 5. The address output unit 7 outputs the address of predetermined area holding the tag information to the address conversion unit 6. As the mode designation data designating the normal mode is inputted from the key register 5, the address conversion unit 6 supplies the address inputted from the address output unit 7 to the frame memory 1 without any conversion. Then tag related information stored in the supplied address area is read from the frame memory 1 and sent to the operation unit 4. The operation unit 4 searches the tag related information sent from the frame memory 1 for tag data related to the output head address inputted at step S61, and obtains the type of the mode.

At step S63, the operation unit 4 determines the type of the mode obtained at step S61. If the mode is the normal mode, as address conversion is not necessary, the process proceeds to step S70, while if the mode is the encryption mode, the process proceeds to step S64.

At step S64, an encryption key is inputted from the operation unit 4. Further, the operation unit 4 transmits a write designation address or write section designation address with respect to the frame memory 1 to the address output unit 7.

At step S65, the operation unit 4 stores the encryption key inputted at step S64 into the key register 5.

At step S66, the encryption key is inputted from the key register 5 into the address conversion unit 6. Then, an address outputted from the address output unit 7 is converted based on the encryption key, and the converted address is supplied to the frame memory 1.

On the other hand, at step S70, as the normal mode is designated, the address conversion unit 6 outputs the address inputted from the address output unit 7 to the frame memory 1 without any conversion.

At step S67, in synchronization with the address input from the address conversion unit 6, image data is read out from an internal cell of the address from the frame memory 1, and sent to the image output selector 8.

At step S68, if there is next address input from the address output unit 7, the process proceeds to step S69, while if there is no address input, the process ends.

At step S69, if the mode is the encryption mode, the process returns to step S66, to repeat the processing. If the mode is the normal mode, the process returns to step S70 to repeat the processing.

The image-data read out (reproduction) processing procedure in the second embodiment is as described above.

Note that as in the case of the first embodiment, various changes may be made in the construction of the address conversion unit 6 and encryption key management.

Third Embodiment

Next, the third embodiment will be described. In the first embodiment as shown in FIG. 1, the information processing apparatus is used for address conversion upon image storage and image reproduction as an independent apparatus, however, the present invention is not limited to such purpose.

For example, if the information processing apparatus according to the present invention is applied to a frame memory of a copying machine, the copying machine has an encryption function.

Figure 7:
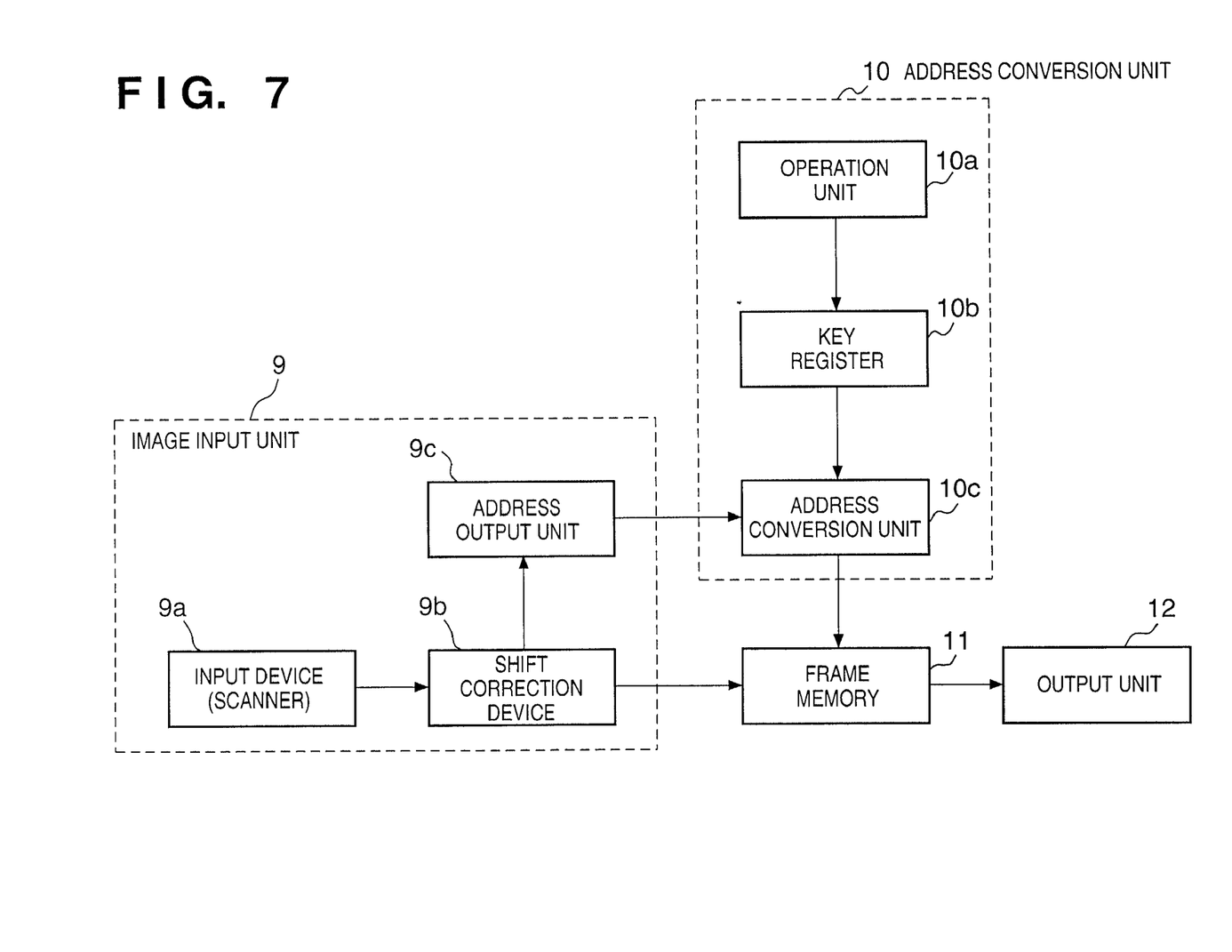
FIG. 7 is a block diagram showing the basic construction of the information processing apparatus according to a third embodiment of the present invention.

FIG. 7 shows the construction of a copying machine having an encryption function.

In FIG. 7, in an image input unit 9, a shift correction device 9b performs positional correction on an image read from an input device (scanner) 9a for preventing positional shift of original document on a platen. Then the corrected image is stored into a frame memory 11.

Since the operations of address output unit 9c, address converter 10 and its internal modules are the same as those in FIG. 1, the explanation of the operations will be omitted.

Further, data writing to the frame memory 11 is made with respect to an area designated by an address converted in accordance with a similar procedure to that described above.

The content of the frame memory 11 is finally read sequentially from the head address, and is outputted from an output unit 12.

Generally, as the output unit of copying machine is a printer, a printed output can be obtained. As the printed output is encrypted in accordance with a key inputted by a user from an operation unit 10a, it is illegible. To reproduce the original image, the encrypted document is read again from the image input unit 9, and is outputted in a decryption mode in accordance with the same key as that in the encryption. As the method of generating a conversion address of the frame memory upon encryption and decryption is the same as that in FIG. 4, the explanation of the method will be omitted. Further, as described above, the encryption key may be included in a printed output for decryption without input from the operation unit 10a.

Further, in use of facsimile machine, as long as the machine has a memory to hold several pages of transmission document, encryption upon transmission is possible by providing the frame memory of the information processing apparatus according to the present invention. In this case, the encrypted document may be decrypted by an operator's inputting a predetermined key upon printing of confidential document.

Further, the purpose of the present invention is not limited to the frame memory. For example, the invention can be applied to a method for accessing a memory constructing a main storage device of a general computer.

In this case, as an area holding secret information is accessed by using address conversion by a key, even if the area is accessed by a third person who does not know the key, the position of the information or normal order of information cannot be obtained. Thus data security can be improved.

Note that in the above construction of the information processing apparatus, the address conversion unit 6 is realized by circuits, however, processing equivalent to the processing by the address conversion unit 6 can be realized by software program which is stored into a memory and executed by a predetermined CPU. The advantage of this case is as described above.

As described above, an information storage device having an encryption function can be realized by providing a memory constructing a frame memory for storing an original image, adding a register and a converter to an address designation device, and providing means for performing conversion processing on a physical address inputted into the address designation device by using the converter in accordance with a value stored in the register.

Further, as described above, the frame memory addressing method according to the present invention weakens the linkage between the frame memory and an original image, and even if data is read by a third person, causes difficulty in reproduction of original image.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

The present invention is not limited to the above embodiments and various changes and modifications can be made within the spirit and scope of the present invention. Therefore, to appraise the public of the scope of the present invention, the following claims are made.

What is claimed is:

1. An information processing apparatus having a step of storing data into storage means, comprising:
    key input means for inputting a desired key code;
    address receiving means for receiving a first physical address designating a storage position for holding the data in the storage means;
    address conversion means for converting the first physical address of the storage means into a second physical address of the storage means based on the desired key code inputted by said input means; and
    storage control means for storing the data at a storage position of the storage means designated by the second physical address obtained by said address conversion means.

2. The information processing apparatus according to claim 1, wherein said address conversion means performs mutually reversible conversion between said first physical address and said second physical address by the same key code.

3. The information processing apparatus according to claim 2, wherein said address conversion means interchanges several address lines of said first physical address based on the desired key code inputted by said key input means to generate said second physical address.

4. The information processing apparatus according to claim 2, wherein if said data is image data, said address conversion means performs address conversion so as to interchange positions of a predetermined areas divided from the image.

5. The information processing apparatus according to claim 2, further comprising key code conversion means for generating a second key code from said input desired key code,
    wherein said address conversion means converts said first physical address to said second physical address based on said second key code.

6. The information processing apparatus according to claim 1, further comprising input selection means for selecting one input destination from plural data input destinations,
    wherein data from the input destination selected by said input means is stored into said storage means.

7. The information processing apparatus according to claim 4, wherein said plural data input destinations include a scanner, a large-capacity storage device and a communication device.

8. The information processing apparatus according to claim 1, further comprising output selection means for selecting one output destination from plural data output destinations,
    wherein data read from said storage means is outputted to the output destination selected by said output selection means.

9. The information processing apparatus according to claim 6, wherein said plural data output destinations include a printer, a large-capacity storage device, a display and a communication device.

10. The information processing apparatus according to claim 1, wherein said data is image data.

11. The information processing apparatus according to claim 1, further comprising a scanner for inputting data to be stored in said storage means and a printer for outputting data stored in said storage means,
    wherein said information processing apparatus operates as a copying machine.

12. The information processing apparatus according to claim 1, wherein a scanner or communication device can be selected as an input source for inputting data to be stored in said storage means, and wherein said communication device and a printer can be selected as an output destination for outputting data from said storage means, further wherein said information processing apparatus operates as a facsimile machine.

13. The information processing apparatus according to claim 1, further comprising address conversion designation means for designating execution or non-execution of address conversion by said address conversion means.

14. A data security method for the information processing apparatus in claim 1, comprising the steps of:
    for encryption, storing input data into said storage means while converting an address by said address conversion means based on the desired key code inputted from said key input means, and outputting the data as encrypted data to the outside and holding the data; and
    for decryption, storing said held data as input data into said storage means while converting the address by said address conversion means based on the same key code as said desired key code inputted form said key input means, and outputting the data as decrypted data to the outside.

15. A data security method for the information processing apparatus in claim 1, comprising the steps of:
    for encryption, storing said key code and input data into said storage means while converting an address by said address conversion means based on the desired key code inputted from said key input means, and outputting them as encrypted data to the outside and holding the data; and
    for decryption, storing said held data as input data into said storage means while converting the address by said address conversion means based on the same key code as said desired key code reproduced from said held data, and outputting said data as decrypted data to the outside.

16. An information processing method for storing data into storage means, comprising:
a key input step of inputting a desired key code;
an address receiving step of receiving a first physical address designating a storage position for holding the data in the storage means;
an address conversion step of converting the first physical address of the storage means into a second physical address of the storage means based on the desired key code inputted at said input step; and
a storage control step of storing the data at a storage position of the storage means designated by the second physical address obtained at said address conversion step.

17. The information processing method according to claim 16, wherein at said address conversion step, mutually reversible conversion is performed between said first physical address and said second physical address by the same key code.

18. The information processing method according to claim 16, wherein at said address conversion step, several bits of said first physical address are interchanged based on the desired key code inputted at said key input step, to generate said second physical address.

19. The information processing method according to claim 17, wherein at said address conversion step, if said data is image data, address conversion is performed so as to interchange positions of a predetermined areas divided from the image.

20. The information processing method according to claim 17, further comprising a key code conversion step of generating a second key code from said input desired key code,
wherein at said address conversion step, said first physical address is converted to said second physical address based on said second key code.

21. The information processing method according to claim 16, wherein said data is image data.

22. A security method in use of the information processing method in claim 16 in a printer, comprising the steps of:
encrypting received image data by said information processing method and print-outputting the data; and
reading the print-outputted encrypted data by a scanner or copying machine capable of decryption in accordance with the same key as that used in encryption by said information processing method.

23. A security method in use of the information processing method in claim 16 in a scanner, comprising the steps of:
encrypting read image data by said information processing method; and
print-outputting or decoding the encrypted data by a printer or computer capable of decryption in accordance with the same key as that used in encryption by said information processing method.

24. A security method in use of the information processing method in claim 16 in a copying machine, comprising the steps of:
encrypting read image data by said information processing method and print-outputting the data; and
reading the print-outputted encrypted data in accordance with the same key as that used in encryption by said information processing method.

25. A security method in use of the information processing method in claim 16 in a facsimile machine, comprising the steps of:
encrypting read image data by said information processing method and transmitting the data; and
decrypting the received encrypted data in accordance with the same key as that used in encryption by said information processing method and print-outputting the data.

26. The security method according to claim 25, further comprising the steps of:
print-outputting the received encrypted data; and
reading the print-outputted encrypted data, decrypting the data in accordance with the same key as that used in encryption by said information processing method and print-outputting the data.

27. A security method in use of the information processing method in claim 16 in a communication device, comprising the steps of:
encrypting data by said information processing method and transmitting the data; and
decrypting the received encrypted data in accordance with the same key as that used in encryption by said information processing method and print-outputting the data.

28. The security method according to claim 27, wherein said key is embedded in an encryption key to be transmitted.

29. A security method in use of the information processing method in claim 16 in a computer, comprising the steps of:
encrypting data by said information processing method and storing the data; and
decrypting the stored encrypted data in accordance with the same key as that used in encryption by said information processing.

30. An information processing program, embodied in a computer readable medium, for storing data into storage means in a computer-readable format,
said information processing program comprising:
a key input step of inputting a desired key code;
an address receiving step of receiving a first physical address designating a storage position for holding the data in the storage means;
an address conversion step of converting the first physical address of the storage means into a second physical address of the storage means based on the desired key code inputted at said input step; and
a storage control step of storing the data at a storage position of the storage means designated by the second physical address obtained at said address conversion step.

31. The program according to claim 30, wherein at said address conversion step, mutually reversible conversion is performed between the first physical address and the second physical address by the same key code.

32. The program according to claim 30, wherein at said address conversion step, several bits of first physical address are interchanged based on the desired key code inputted at said key input step, to generate the second physical address.

* * * * *

UNITED STATES PATENT AND TRADEMARK OFFICE
CERTIFICATE OF CORRECTION

PATENT NO. : 6,968,397 B1
APPLICATION NO. : 09/672770
DATED : November 22, 2005
INVENTOR(S) : Yoshiji Kanamoto It is certified that error appears in the above-identified patent and that said Letters Patent is hereby corrected as shown below:

Column 2,
Line 12, delete "a".

Column 6,
Line 28, "converts" should read -- convert --.

Column 9,
Line 61, "conversion" should read -- conversions --.

Column 13,
Line 20, "CPU" should read -- the CPU --.
Line 32, "appraise" should read -- apprise --.
Line 62, delete "a".

Column 15,
Line 31, delete "a".

Signed and Sealed this

Twenty-seventh Day of June, 2006

JON W. DUDAS
*Director of the United States Patent and Trademark Office*